United States Patent [19]

Novoa

[11] Patent Number: 5,020,644

[45] Date of Patent: Jun. 4, 1991

[54] AUXILIARY MASS DAMPER FOR SLENDER FLEXIBLE ELEMENT SUBJECT TO VIBRATION

[76] Inventor: Fernando Novoa, Luis Zegers 303, Santiago, Chile

[21] Appl. No.: 359,887

[22] Filed: Jun. 1, 1989

Related U.S. Application Data

[63] Continuation-in-part of Ser. No. 704,132, Feb. 20, 1985, Pat. No. 4,858,738, which is a continuation of Ser. No. 606,131, May 2, 1984, abandoned, which is a continuation of Ser. No. 936,051, Aug. 23, 1978, abandoned.

[30] Foreign Application Priority Data

Jul. 26, 1978 [CL] Chile .................................... 470/78

[51] Int. Cl.$^5$ ............................................. F16F 7/10
[52] U.S. Cl. .................................... 188/378; 188/268; 267/136
[58] Field of Search ............... 188/378, 379, 380, 268, 188/266, 269; 52/167, 573; 267/136, 137, 138, 139, 140; 248/548; 174/42; 200/301

[56] References Cited

U.S. PATENT DOCUMENTS

| | | | |
|---|---|---|---|
| 1,995,620 | 3/1935 | Monroe | 174/42 |
| 2,417,347 | 3/1947 | Brown | 188/268 |
| 2,732,040 | 1/1956 | DeVost et al. | 188/268 |
| 2,816,752 | 12/1957 | Stene | 188/268 X |
| 3,938,625 | 2/1976 | Radermacher et al. | 188/268 |
| 4,350,233 | 9/1982 | Buckley | 188/268 X |
| 4,858,738 | 8/1989 | Novoa | 188/268 X |

*Primary Examiner*—Douglas C. Butler
*Attorney, Agent, or Firm*—Cushman, Darby & Cushman

[57] ABSTRACT

Structures subject to seismic or other vibrations, such as structurally flexible elements of electrical and mechanical power plants, are effectively damped to reduce stresses resulting from such vibrations, by a system of auxiliary mass dampers. The dampers are advantageously connected to the regions of greater expected oscillation in response to such vibrations, to reduce structural stresses. A preferred auxiliary mass damper takes the form of a receptacle containing a fluent or granular material such as lead birdshot in mineral oil.

30 Claims, 4 Drawing Sheets

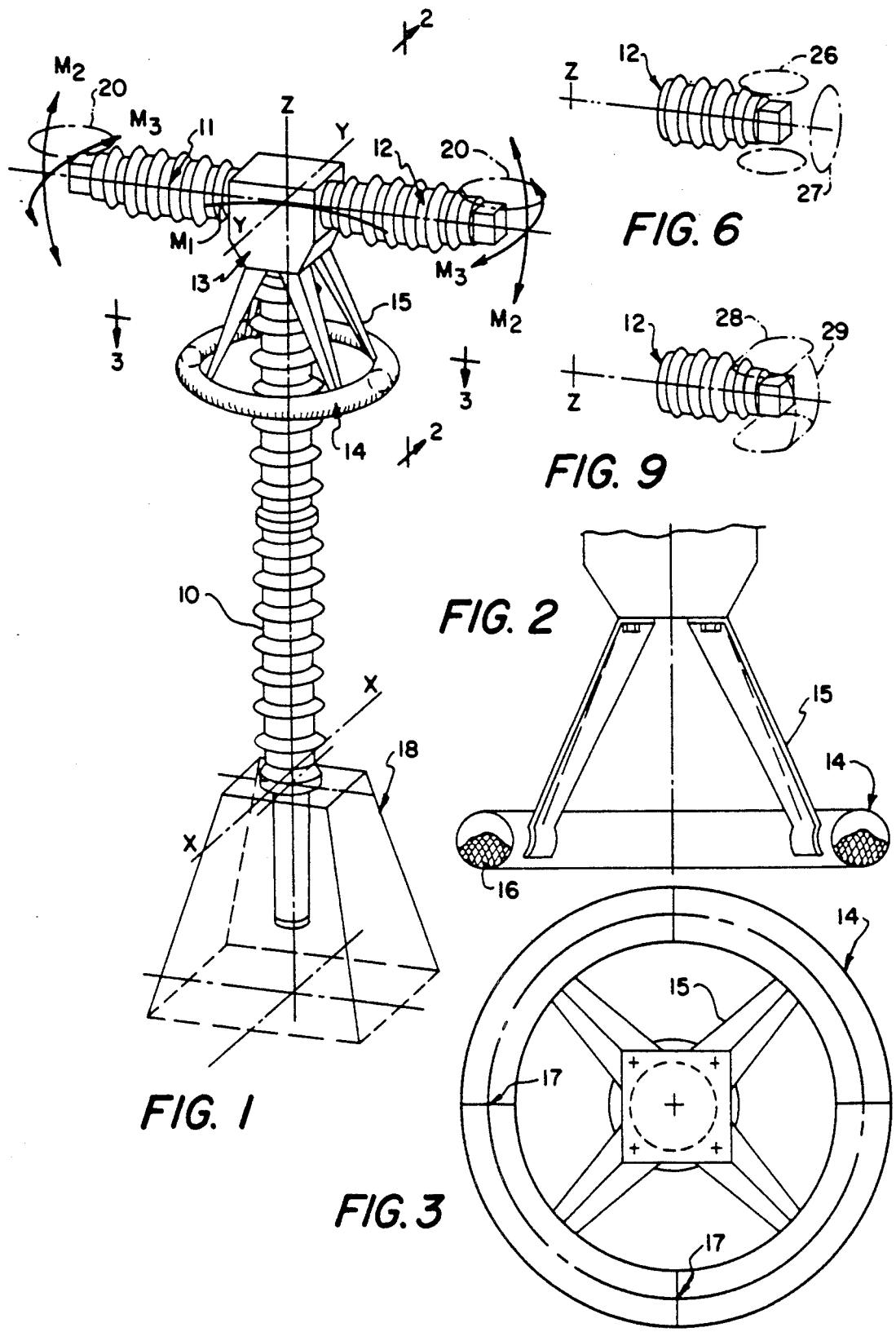

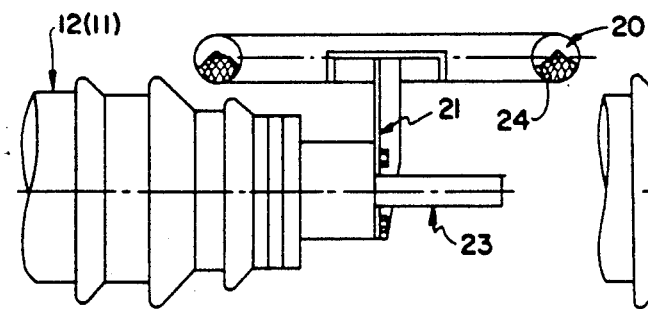
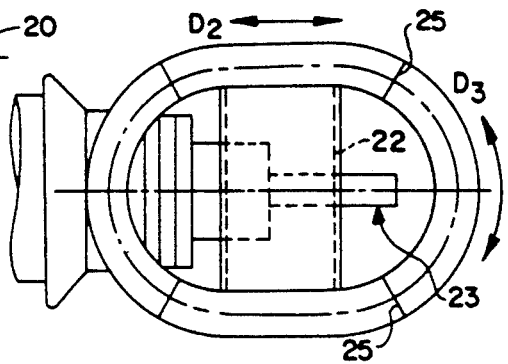
FIG. 4   FIG. 5
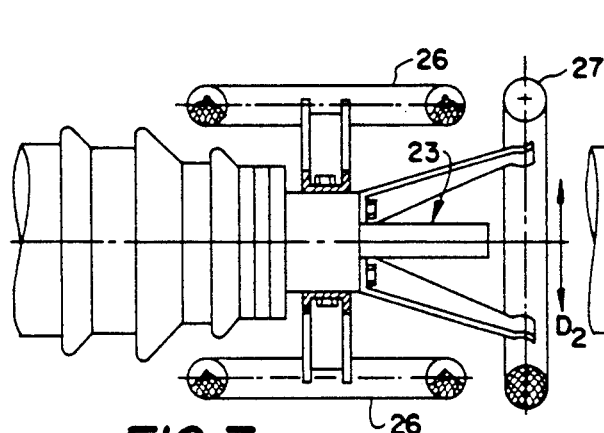
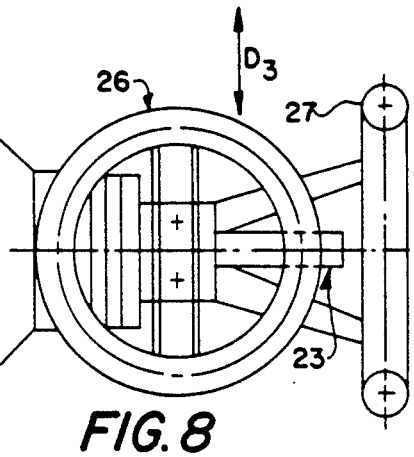
FIG. 7   FIG. 8
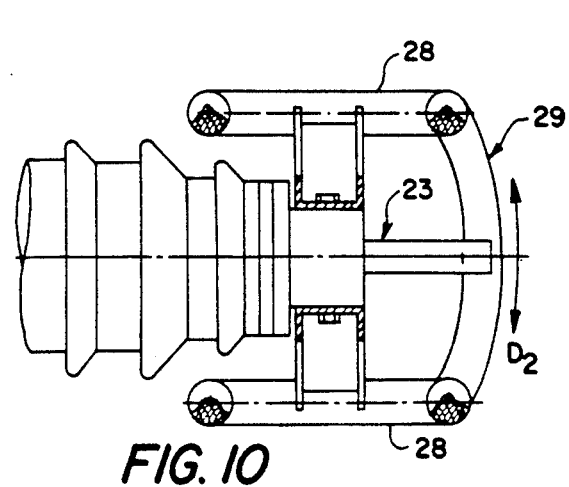
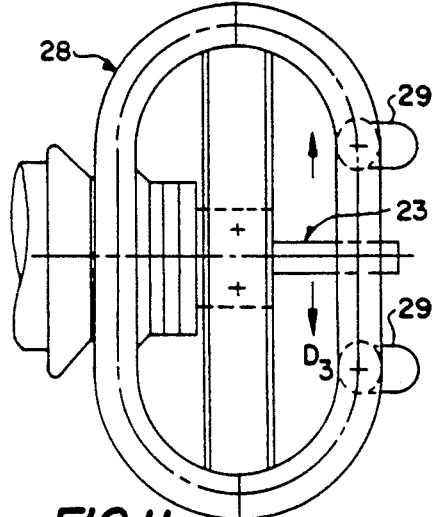
FIG. 10   FIG. 11

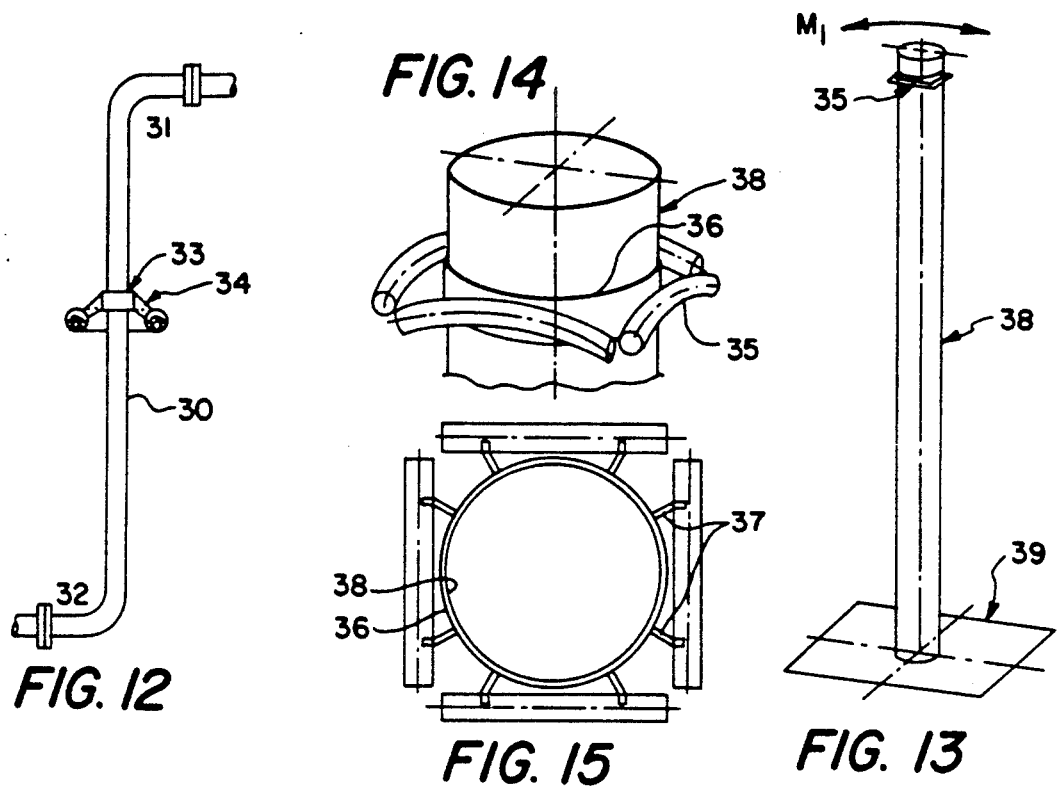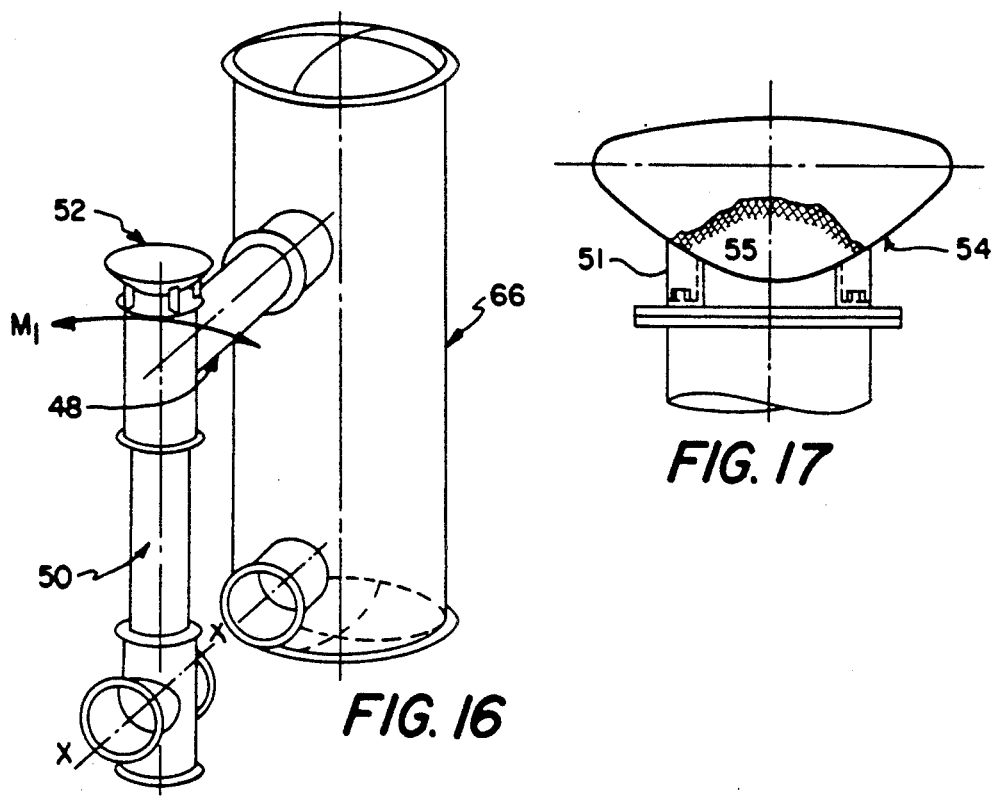

AUXILIARY MASS DAMPER FOR SLENDER FLEXIBLE ELEMENT SUBJECT TO VIBRATION

This is a continuation-in-part of application Ser. No. 06/704,132, filed Feb. 20, 1985, now U.S. Pat. No. 4,858,738, which was a continuation of application Ser. No. 06/606,131 filed May 2, 1984, now abandoned, which was a continuation of application No. 05/936,051, filed Aug. 23, 1978 now abandoned.

FIELD OF THE INVENTION

This invention relates to a system of auxiliary mass dampers, to limit the oscillations induced by vibrations of either seismic or some other origin, upon structurally flexible elements and parts, in electrical and mechanical power plants.

The invention relates more specifically to the need of either reducing or limiting, in the aforementioned elements and parts of power plants, the amplitude of oscillations induced on them by the vibrations specified. When these elements and parts are, on account of their nature, flexible and of only limited structural strength, they cannot be dimensioned to resist either the maximal structural loads or the maximal displacements which may be induced on them by the vibrations. This is because these elements represent an oscillator, with their structural flexibility representing the elastic component, and their structural weight, the oscillating mass.

BACKGROUND OF THE INVENTION

The energy introduced by the vibration begins to accumulate, in the oscillatory play between the kinetic energy acquired by the mass, and the potential energy, generated after a certain delay by the elastic component, depending on the natural period of the oscillator. This oscillatory amplitude increases, until a state of equilibrium is reached between the energy being introduced by the vibration, and the energy being dissipated, as a result of the elastic hysteresis in the structural materials, and the possible friction opposed to the movement of the mass. Both of these effects, jointly, represent the damping of the oscillator. When this damping is low, on account of the nature of the element, the amplitude of the oscillations can only be limited by introducing separate damping devices.

In the elements of the plants described above, the structural materials and elements used (insulators, metal structures) frequently have low energy absorption characteristics. Introducing vibration dampers into these elements may be, however, difficult; the dampers, to operate, need to detect the motion of the oscillator relative to the ground. But, in general, they cannot be coupled to the region of maximum displacements of the elements (upper part of a column, middle part of a beam), and must therefore be inserted or connected, in the definite form of vibration isolators, between the element and its supports (base of a column, supporting ends of a beam). However, these vibration isolators introduce considerable elasticity which is sometimes a distinct advantage, but in most cases represents a serious difficulty, even an insuperable one, because of the changes which this flexibility may have on other functional characteristics of the element.

The design of the vibration isolators themselves has been minimized because of the location problem, and it has been found that the isolators are often self-defeating, because of the displacements at other parts of the element, which become strongly amplified, as a consequence of the isolators' elasticity.

These difficulties have resulted in the use of, which the elements and parts of the abovementioned plants, the already known principle of the dynamic vibration absorber, which is a secondary oscillator fixed on the element, in the zone of its maximal displacements, and which transforms part of the energy into dynamic reaction pulses, with a period somewhat different to that of the principal oscillator. If the ratios of the masses and of the periods are correct, the reaction pulses will be adequate to reduce the oscillatory energy within the principal oscillator, and the oscillations will be limited by this dynamic effect, with a final result similar to what could have been obtained from an efficient set of vibration isolators.

From this explanation itself, it is believed evident that the dynamic absorber can only be operative if the values of its mass and its elasticity, are definitely determined for the principal oscillator involved, and then, only for certain periodic vibrations. In other cases, the pulses of the auxiliary mass could prove, at certain moments at least, self-defeating, and can contribute forced vibrations to increase the vibrational energy rather than to limit it.

In theory, this danger is overcome by introducing into the secondary oscillator an adequate damping: this oscillator may be, in this case, considered as a device which pumps out of the principal oscillator, a part of the energy, to dissipate it within itself. An excessive value for this damping could still cause undue dynamic reactions, but the dynamic absorbing will be effective, for a range of values of the mass and the elasticity of the auxiliary oscillator. Optimum effects could be obtained with masses between 10 and 20% of the principal one; natural frequencies within ±20% of the frequency of the principal oscillator, and auxiliary damping, between 10 and 20% of the critical.

If one intends to use a system of such auxiliary mass dampers of a standard design, even these values could be considered as demanding a too close matching to the element, for adequate efficiency. However, problems can arise, if one considers that there is a certain interaction between these values, within these ranges, and the fact that the vibrations we are interested in are, by nature, irregular and transient.

SUMMARY OF THE INVENTION

There are, however, three more measures to be taken to reduce the difficulties; a) to fractionate or divide the auxiliary mass into a quantity of small bodies or particles, so as to make its apparent frequency more or less of a statistical behavior, than a definite value; b) to discard or eliminate the elasticity of the auxiliary oscillator, leaving the mass to be restored by a means less well defined than that of a spring; c) to eliminate the restoring effect for the mass, by having the auxiliary oscillator reduced to a "mass" with a "damper", but without any apparent "elasticity" (a static oscillator). The three measures represent, as an end result, the introduction of different types or grades of "non-linearity" into the auxiliary oscillator.

I have found that, practically all of the aforementioned conditions can be obtained, in the simplest form of the system of auxiliary mass dampers of this invention by disposing, within the zones of maximum oscillatory response to vibrations of the element, one or more receptacles, either communicating or not, within which is put a ballast composed of a quantity of loose particles or small bodies which can be shaken more or less freely, and immersed or not within a liquid or gaseous medium, different to plain atmospheric air.

The proposed system has features and advantages which will now be discussed.

The ballast represents a mass, variable in form with friction, whose center of gravity is displaced within the receptacle, on submitting the receptacle to oscillation, but is restored to a preferred position by the combined action of gravity, possible position by the combined action of gravity, possible effects of an immersion medium, and the oscillation accelerations themselves. The unit represents, therefore, an auxiliary oscillator capable of acting as an auxiliary mass damper.

This auxiliary oscillator does not having any elastic component as such. This does not exclude, however, a receptacle of a shape adequate to provide a more or less linear mass restoring force, which becomes more linear with more minutely divided particles immersed in a liquid, and with reduced amplitudes of oscillation. With higher amplitudes, however, the "non-linearity" of this auxiliary oscillator will always appear progressively with a minutely divided ballast in liquid, and more abruptly, for a coarser ballast without liquid. These characteristics can be considered the most desirable in several cases, especially if one remembers that the dynamic effect of the auxiliary oscillator consists essentially in transforming the displacements of a larger mass, into larger displacements of a smaller mass. The irregular and transient vibrations can move the auxiliary mass to occasionally larger displacements, for which the "non-linear" characteristic will be valuable; with more regular vibrations, on thee other hand, a "quasi-linear" characteristic is desirable.

The proposed system can provide, with reasonable dimensions, the necessary characteristics for both, the apparent oscillatory mass and the apparent natural frequency. Considering, for example, elements with 1000 kg or less of oscillatory mass, and 2 Hz or more of natural frequency, and using ballasts, of metallic fillings, sand, lead birdshots, or steel balls, either combined or not with mineral oil, receptacles from 30 to 40 liters are sufficient and acceptable without considering up to now, the possibility and the advantage, of apportioning the damping effect among several receptacles, as discussed below.

To arrive to the optimal apparent frequency of the absorber, the speed of movement of the ballast can be regulated, by means of the shape and the dimensions of the receptacles, internal divisions which could be disposed within them, and/or the effects of the immersion medium which could be used with the ballast.

The construction of the auxiliary oscillators is, of course, adequate to obtain within them, without problems, the necessary damping. The friction between the particles of ballast and against the receptacle, can be controlled through their size, their shape and their superficial conditions; the hydrodynamic resistance to oppose motion within the immersion medium may be varied, depending on the viscosity or buoyancy it can offer to the particles, or on the shape of the particles (ballast could be composed of small tube pieces, for example); obstacles can be provided to oppose the displacement of ballast, such as the inner shape or surface condition of the receptacle, or baffles or diaphragms can be disposed in it; adequate use of all these three major factors will allow, in each case, to attain adequate damping, which is so important to the efficiency of a dynamic absorber for the type of application involved.

With the auxiliary oscillators proposed, it is easy to decrease or, even to arrive at the suppression of all restoring force, by the simple expedient of adopting receptacles, either annular or cylindrical, with a flat bottom. Ballast equilibrium will be indifferent in them, with the advantages of good dynamic absorption for a wider range of frequencies, although without arriving at optimal values for any particular frequency. The end of movement of the ballast at each shaking, will be reached without impact problems, since the single shock is reduced by impacts of the particles in a succession.

Freedom of displacement for the ballast is an important characteristic of the type of auxiliary oscillator proposed. First, on account of this displacement being limited only by the shape and the dimensions of the receptacle, the receptacle can be constructed so that the displacement of the ballast is greater than the displacement of the element involved, at the point of attachment of the oscillator. This enables the oscillator to accomplish its dynamic function.

Second, freedom of displacement makes the ballast effective, within the same receptacle, for any direction of oscillation normal to its axis of symmetry and, even for certain components of oscillation in the direction of this axis. This is a considerable advantage for a dynamic absorber which is part of a system with normalized design, and represents a further advantage by allowing the receptacle to be disposed with its symmetry axis at an angle with the vertical direction. With some effectiveness limitations, the receptacle can also be disposed with its symmetry axis horizontal.

Third, the ballast can be displaced also around the axis of symmetry, which allows the receptacle to be effective, in part, for torsional oscillations on this axis. For efficiency reasons, however, it will be generally preferable to dispose two additional receptacles at the zones with maximum torsional displacements, and these additional receptacles can be disposed so as to contribute also, to the dynamic absorption of the lateral oscillations which the first receptacle absorbs.

The apportioning of the absorption effect between several receptacles is also very important for reasons differing from these mentioned just above, or from the dimensional considerations of the receptacle.

First, it may be that either functional conditions of the element or its physical layout make it necessary to use several receptacles and to conform each receptacle to particular conditions; it is not excluded, in this case, that several receptacles may be communicating, to obtain a certain interchange of ballast between them.

Second, the element may behave as a set of flexible elements, in which instance it would be desirable to separately dynamically limit the oscillatory response of each. In case there are two components with sufficiently close frequencies, oscillatory coupling between them can increase oscillation intensity. When it is not possible to avoid this coupling by a structural rearrangement, it becomes very important to shift the frequencies which introduces, by nature, the dynamic effect on each element. Properly used, this frequency displacement can be used to separate apart the final frequencies, to reduce the original coupling.

Third, within an element in need of dynamic damping, there may be a definite distribution of masses and rigidities which cause modes of oscillation differing from the fundamental one, which may have effects that may be necessary to consider. The apportioning of the dynamic absorption among different receptacles, will allow disposing them in the zones of mass concentrations for the several modes, making much better the general effect of the damping.

It is important to discuss, also, the importance of the secondary effects of a system of dynamical absorbers as proposed, upon the elements to be treated.

First, it has been noticed, during the analysis of seismic tests upon high tension electrical equipment, the quite considerable effect which the simple presence of chambers with a quantity of oil can exert on the upper part of columns subject to vibrations at the base. A system such as proposed with all the optimization possibilities mentioned above, can be used that will considerably reduced the loads induced by vibration. If the structural (oscillatory) loads are reduced, for example, by 2.5 times, the increase in mass due to the weight of the auxiliary mass dampers is not significant and would add, in any case, less than 30% to the mass of the principal oscillator.

To demonstrate the versatility and advantages of the invention, preferred embodiments of the system of the invention will be described with reference to the drawings.

FIG. 1 is a perspective view of a pole of a 245 leV power circuit breaker provided with a first embodiment of means for damping oscillatory movement thereof in accordance with principles of the present invention;

FIG. 2 is a larger scale fragmentary side elevation view thereof, partly broken away and sectioned on line 2—2 of FIG. 1;

FIG. 3 is a larger scale fragmentary transverse cross-sectional view thereof on line 3—3 of FIG. 1;

FIG. 4 is a larger scale fragmentary side elevation view of the rightmost breaking chamber shown in FIG. 1;

FIG. 5 is a fragmentary top plan view of the breaking chamber shown in FIG. 4;

FIG. 6 is a fragmentary perspective view of the rightmost breaking chamber shown in FIG. 1, but illustrating a second embodiment of means for damping oscillatory movement of the circuit breaker pole;

FIGS. 7 and 8 are larger scale fragmentary views, comparable to FIGS. 4 and 5, but of the embodiment shown in FIG. 7;

FIG. 9 is a fragmentary perspective view of the rightmost breaking chamber shown in FIG. 1, but illustrating a third embodiment of means for damping oscillatory movement of the circuit breaker pole;

FIGS. 10 and 11 are larger scale fragmentary views, comparable to FIGS. 4 and 5, but of the embodiment shown in FIG. 9;

FIG. 12 is a side elevation of a vertical pipe provided with a fourth embodiment of means for damping oscillatory movement thereof;

FIG. 13 is a perspective view of a cantilevered chimney provided with a fifth embodiment of means for damping oscillatory movement thereof;

FIG. 14 is a larger scale fragmentary perspective view of the upper-end portion of the chimney shown in FIG. 13;

FIG. 15 is a top plan view of the structure shown in FIG. 14;

FIG. 16 is a perspective view of an SF6 metalclad section including a circuit breaker together with some related bus bar elements of an electrical switch gear assembly, illustrating a sixth embodiment of means for damping oscillation of elements of the assembly;

FIG. 17 is a larger scale fragmentary side elevation view of the FIG. 16 assembly, with parts broken away and sectioned;

DESCRIPTION OF PREFERRED EMBODIMENTS

Figure 20:
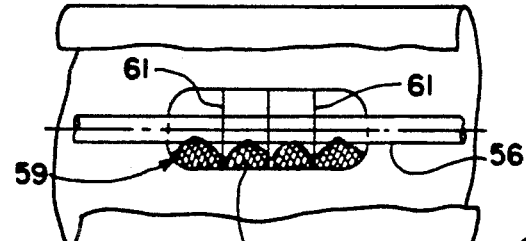
FIGS. 19-21 are larger scale fragmentary longitudinal sectional views of three respective portions of the assembly shown in FIGS. 16 and 18.
Figure 19:
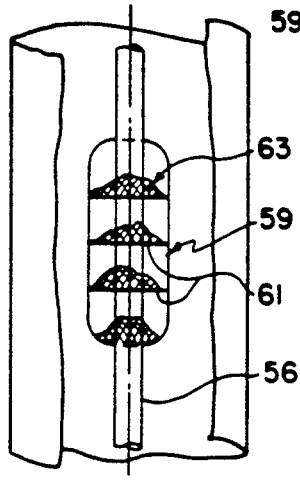

FIG. 1 is a perspective view of the pole of a 245 kV power circuit breaker. Externally, the structure of the pole consist of a slender column 10, predominantly of electrical porcelain, surmounted by two symmetrical horizontal breaking chambers 11 and 12, assembled between them and against the column by the metallic intermediate piece 13.

The whole of the column may oscillate in a mode $M_1$ around an axis X—X, in response to a seismic perturbance at the base 18 of the circuit breaker pole.

To the piece 13, it is assembled a toroidal hollow ring 14, concentric to the column 10, through rigid sloping supports 15. A detail view, FIG. 23 shows the ring 14, its supports 15 to the piece 13 and a ballast of birdshot in mineral oil, inside the hollow ring.

The ring is hermetically sealed, formed from metal, and has a relatively smooth outer surface. When constructed as described, the ring 14 represents an electrostatic field governing ring, and can be mounted on column 10 in place of an existing ring with such function.

Notwithstanding, the ballast 16 inside the ring 14 having a mass of 1/5 to 1/10 of the mass of the column moving in the oscillatory mode $M_1$, and displacing against the hollow ring 14 with an apparent frequency of 0.8 to 1.0 times the frequency of the column in the mode $M_1$, being able furthermore to displace the CG of the ballast against the hollow ring by about 5 to 10 times the maximum horizontal displacement of the upper part of the column under oscillatory mode $M_1$; all of this make that the hollow ring 14, plus the ballast 16, represent an auxiliary mass damper which, in view of the discussion above, will evidently dampen the oscillatory movement $M_1$ of the column 10 around any axis X-X in an horizontal plane at its base.

To adequately proportionate the frequency of displacement of the ballast 16 and the magnitude of displacement of its CG with respect to the hollow ring 14, it may be useful to dispose within the ring 14, some three or four inner divisions 17 which confine the displacement of the ballast within a corresponding part of the ring.

If and when the upper part of the column, comprising the two breaking chambers 11 and 12 is sufficiently rigid supported by the column 10 and the connecting piece 13, the damping provided by the ring 14 will suffice to ensure the circuit breaker column against an earthquake.

Two further factors for flexibility may occur, notwithstanding, in the column: first, the connecting piece 13 may allow for a vertically rotational movement $M_2$ of the breaking chambers 11 and 12 and, second, a torsional flexibility of the column 10 itself may allow for an horizontal rotational mode $M_3$ of both chambers 11 and 12.

Both oscillatory modes $M_2$ and $M_3$, being dependant only on separate factors of design of the circuit breaker, could present themselves with frequencies of oscillation in the vicinity of the frequency of $M_1$. This would make for a demanding need of separately damping $M_2$ and $M_3$, on account of the coupling between the three oscillatory modes.

FIGS. 1, 4 and 5 show a first alternative to cope with the damping of $M_2$ and $M_3$, in the form of two dampers, each at the end of one of the chambers 11 and 12, represented by their horizontal toroidal axis 20 only. FIGS. 4 and 5 show the hollow ovoidal horizontal ring 20, longitudinally disposed upon the end of each of the chambers 11 and 12, supported by the rigid pieces 21 and 22 to the end surface of the block carrying the HV terminal 23 of the breaking chambers.

The ballast of birdshot in mineral oil would be free to move within the ring 20, providing with a displacement $D_2$ a damping against $M_2$, and with the displacement $D_3$ respectively against $M_3$. Both the displacements $D_2$ and $D_3$ could be separated through inner divisions 25 within the ring 20, but the ring without divisions would be preferable.

FIGS. 6-8 show a second alternative for damping modes $M_2$ and $M_3$: here, two smaller circular rings 26, one upon and one below the terminal block of chambers 11 and 12, would dampen the torsional mode $M_3$, and one vertical ring 27, very similar to the ring 14, would dampen the mode $M_2$, this time through the vertical displacement $D_2$ of its ballast. To compensate for the action of gravity upon the ballast, this would be made of wire pieces of an adequate density metal, submerged in an adequate viscosity mineral oil.

FIGS. 9-11 show a third alternative to the same end: here, the ovoidal transversal rings 28, upon and below the terminal block of the chambers, would dampen a rather high oscillatory response $M_3$ through torsion of the column 10, and the separate vertical curved receptacles 29, mechanically supported against the rings 28, but with their ballasts separated from them, would dampen mode $M_2$ through the vertical displacement $D_2$ of their ballast. This would have also to be made of wire pieces in oil. Each of the rings 28 could be advantageously divided in two transversal parts through inner divisions.

FIGS. 12-15 show two examples for the damping against earthquakes of different elements of an industrial plant. FIG. 12 shows a vertical run of piping 30 between two curved endings 31 and 32, with joints, which are supported to be fixed to a building or other stiff support through each of its horizontal parts. The central vertical span of the run being free of supports would acquire an horizontal oscillatory movement which could damage the gaskets of the joints, in case of an earthquake. The horizontal oscillatory movement of the middle of the span could be damped by a hollow ring 55 concentric with the axis of the piping, entirely similar to the ring 14 FIG. 1. The ring would be supported to the pipe by a pressure clamp 33, with two sloping rigid pieces 34. The hollow ring could be metallic or from other adequate material, and the ballast, would be favourably coarse sand in air. Its mass, should 1/5 to 1/10 that of the pipe with contents, and its apparent frequency, 0,8 to 1,0 that of the span.

FIGS. 13-15 cantilever chimney 38 fixed to a base plate 39, on account of its high slenderness, a seismic perturbation at the base would convey an oscillatory mode like $M_1$ which could be damped through a set of hollow tubes 35 fixed to a reinforcing ring 36 to the chimney, as is shown in FIGS. 14 and 15. The tubes could be metallic or from other material and their most compact layout would be that shown in FIGS. 14 and 15, each tube 35 being supported to the reinforcing ring 36 through two rigid supports 37.

It is interesting to notice in this case, that on account of the high slenderness and relatively low mass of the damped chimney, the damping action of the tubes 35 would be conveniently non-linear, by the expedient of giving the tubes a certain downward curvature which would add in this case for an easier damping. The damping ballast is birdshot in air.

FIG. 16 shows an SF6 metalclad section, comprising a circuit breaker together with some busbar elements. The elevation perspective elevation shown, represents the circuit breaker externally through its enclosing tank 66 to which are structurally coupled a horizontal bus bar element 48 together with a vertical one 50. The inverted L shaped structure formed by these elements, would present an oscillatory mode $M_1$ around an axis X—X, for a seismic perturbation at the base. The high susceptibility of this equipment to a loss of gas through the joints would demand a damping of the movement $M_1$. As the L shaped section is relatively rigid and heavy, a damper 52 has been chosen to be assembled at the upper angle of this L, in the form of a paraboloidal receptacle 54 of metal, hermetically sealed, with a ballast 55 of lead birdshot in mineral oil. The receptacle 54 is fixed to the enclosure of the metalclad through four rigid supports 51.

The curved bottom of the receptacle 54, makes the damping very sensitive to even minor oscillatory responses $M_1$, giving occasion at the same time to a bigger restraining force from the damper. The dimensioning would be made as above, with a mass of damping ballast equal to 1/5 to 1/10 of the mass of the L shaped section of the metalclad moving as $M_1$.

Figure 18:
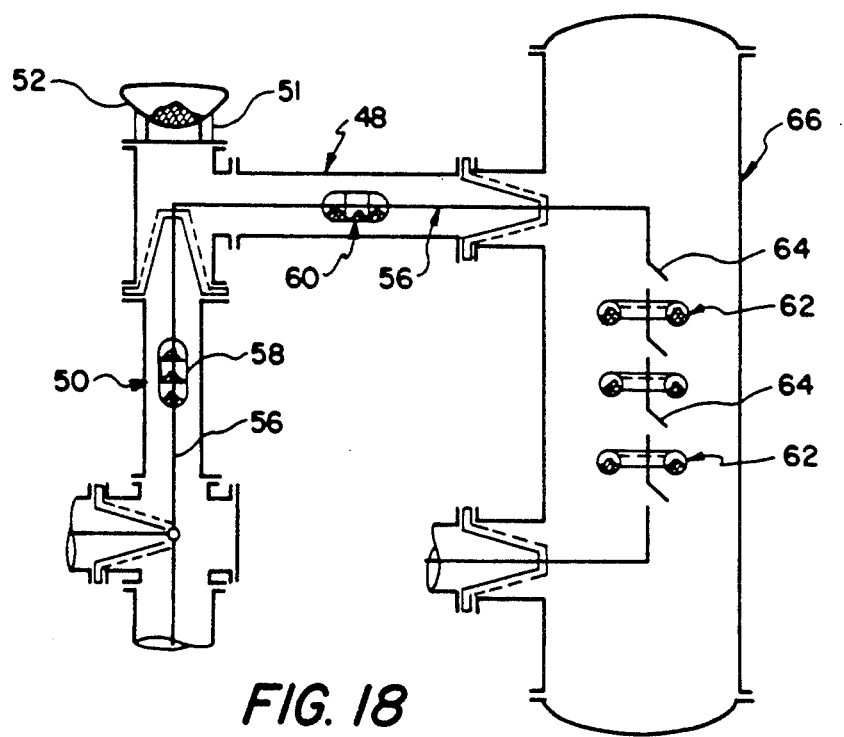
FIG. 18 is a somewhat diagrammatic longitudinal sectional view of the assembly shown in FIG. 16.

FIG. 18 longitudinal shows a section through the whole of the SF6 metal clad section. The HV conductor 56 in the inside may be slender enough to acquire a transversal oscillatory response, which being only dependant on the electrical design of the metalclad, could be coupled with the external oscillatory movement $M_1$, because its frequency being in the vicinity of that of $M_1$.

As the coupling would affect worse the lower mass oscillatory member, the oscillation of the HV conductor 56 inside the busbar sections 48 and 50 of the metalclad could arise up to become unassumable for the electrical functioning or the permanence of the equipment. Ways to solution could be, either to make the conductor 56 itself more rigid (by selecting, for example elements 48 and 50 of the metalclad for an overrated nominal current) or to integrate to said elements auxiliary mass dampers like 58 and 60 in FIG. 3b, which should have a design entirely dependant on the electrical conditions inside these elements. In preparing FIGS. 16-21 detail views it has been assumed that they can be configured as generally cylindrical electrostatic shields 59 concentric to the conductor 56, with several inner divisions 61 which would provide the space for an adequate displacement of a ballast 63 of birdshot in SF6 gas inside each inner space created by such divisions, to allow for the necessary damping of the conductor 56.

Figure 21:
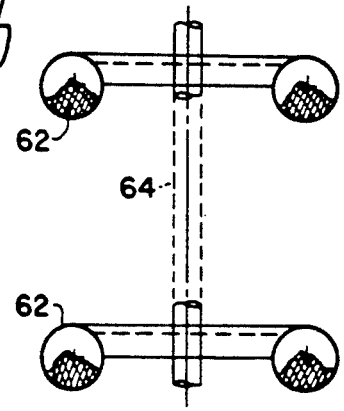

The case for the conductor 56 within the bus bar elements 48 and 50 could also be present for the circuit breaker itself inside enclosure 66, whose breaking mechanisms 64 could suffer from vibration due to a natural flexibility resulting from their inherent electrical design, In FIGS. 18 and 21, a set of auxiliary mass dampers 62 consisting of hollow rings concentric to the conducting elements has been supposedly factible, but only a close working of the real design of the parts together with a whole deployment of the entire range of possibilities for damping, as given, by example, in FIGS. 1–21 together could assure an adequate solution against earthquake perturbances at the place of installation of such metal-clad equipment.

Use of the proposed dynamic absorbing system does not imply that direct absorbing dampers should be excluded. On the contrary, these will be continuously useful, or necessary, as may be the case, to be inserted in those placed where the elasticity introduced by them is useful to reduce possible oscillatory couplings or to permit displacement between the elements where it is necessary, and to limit transmission of loads. The basic objective sought by the system proposed is, on the other hand, to introduce without any change in the structural arrangement of those elements which do not permit the introduction of elasticity, a dynamic effect equivalent to the damping which an efficient set of elastic isolators would offer. In other words, to limit efficiently the oscillation loads on the element, without increasing its displacements.

The proposed dynamic absorbing system only requires at the elements, the space and the support for the receptacles, which makes much simpler the technological problem of adapting oscillation limiters to an existing construction, and reduces the costs of doing it in an existing plant. Only dynamic dampers like 58, 60 and 62 in FIG. 18–21, would need closer coordination with the original design, and would make difficult their addition in an already constructed plant.

It is important, finally, that optimization of the damping system can be attained by simple means. With this invention damping can be optimized on the basis of free oscillating tests of the elements to be submitted to dynamic damping. In this manner, several prototypes can be compared, with different shapes and dimensions of receptacles and different ballast, to select the most adequate for the elements involved. From the results, only one alternative for the receptacles may be tested, for a final optimization of the ballast, on an oscillating table with sinusoidal excitation, to get the best possible response characteristics against the excitation frequency.

A final verification can be made at the same oscillating table, by applying the excitation amplitudes necessary to obtain, for each of the damped resonant frequencies acting upon the element with the final dynamic dampers, the maximum calculated responses, for the specified design vibrations, from the response characteristics mentioned above. The entire test process is similar to the one already known for those elements damped with vibration isolators.

In view of the above, it is apparent that the invention provides a system for dynamically limiting the oscillations induced, upon elements and parts, either component or structural of electrical and mechanical power plants, from vibrations, more or less irregular and transient, of a seismic or another origin, such as the functions of the plant, that may appear in the supports of the elements, or may be introduced on them in any other way.

What is claimed is:

1. An auxiliary mass damper system for reducing or limiting the amplitude of vibratory oscillations induced from an external cause such as seismic activity, in an elongated and slender structurally flexible mechanical element having when oscillating in a given oscillatory mode a given mass, a given natural period of oscillation at a given natural frequency, and which is mounted to the ground so as to have, when subjected to said oscillations, a region of maximum displacement, said auxiliary mass damper system comprising:
at least one closed receptacle containing as a ballast, in an enclosed space having a given volume, a given quantity of loose particles which are subject to being freely shaken;
means rigidly mounting each said receptacle to said mechanical element within said region of maximum displacement.

2. The auxiliary mass damper system of claim 1 in which the elongated and slender structural flexible mechanical element has a longitudinal axis, and wherein:
each said receptacle is a body of revolution symmetrical about said longitudinal axis.

3. The auxiliary mass damper system of claim 2, wherein:
said enclosed space is toroidal.

4. The auxiliary mass damper system of claim 2, wherein:
said enclosed space is cylindrical.

5. The auxiliary mass damper system of claim 4, wherein:
each said receptacle is internally flat bottomed.

6. The auxiliary mass damper system of claim 2, wherein:
said enclosed space is paraboloidal.

7. The auxiliary mass damper system of claim 2, wherein:
at least one said receptacle further includes internal wall means subdividing said space into a succession of angularly adjacent compartments each containing a respective portion of said ballast.

8. The auxiliary mass damper system of claim 1 in which the elongated and slender structurally flexible mechanical element has a longitudinal axis, and wherein:
said at least one closed receptacle comprises a set of angularly elongated receptacles arranged in a series around said longitudinal axis.

9. The auxiliary mass damper system of claim 1, wherein:
said at least one closed receptacle is a toroidal ring which is oval in plan.

10. The auxiliary mass damper system of claim 1, wherein:
said loose particles are immersed in a liquid.

11. The auxiliary mass damper system of claim 10, wherein:
said liquid is mineral oil.

12. The auxiliary mass damper system of claim 1, wherein:
said loose particles consist of metal filings.

13. The auxiliary mass damper system of claim 1, wherein:
said loose particles consist of sand.

14. The auxiliary mass damper system of claim 1, wherein:
said loose particles consist of lead birdshot.

15. The auxiliary mass damper system of claim 1, wherein:
said loose particles consist of steel balls.

16. The auxiliary mass damper system of claim 1, wherein:

said loose particles consist of pieces of tubing.

17. The auxiliary mass damper system of claim 1, wherein:
said loose particles consist of pieces of wire.

18. The auxiliary mass damper system of claim 1, wherein:
said ballast adds less than thirty percent to said given mass, and, in use, said ballast displaces against each receptacle with an apparent frequency of 0.8 to 1.0 times the frequency of oscillation of said given mass when oscillating in said given oscillatory mode.

19. The auxiliary mass damper system of claim 18, wherein:
said given mass is 1000 kg or less and said given volume is 30 to 40 liters, and said given natural frequency is 2 hertz or more.

20. The auxiliary mass damper system of claim 19, wherein:
said ballast has a mass which is equal to from one-tenth to one-fifth of said given mass.

21. The auxiliary mass damper system of claim 1, in which the elongated and slender structural flexible mechanical element has a longitudinal axis, and wherein:
at least one said receptacle has a longitudinal axis which is transverse to said longitudinal axis of said element.

22. The auxiliary mass damper system of claim 2, wherein:
each said receptacle is internally generally flat bottomed, so as to effectively have a generally horizontal bottom.

23. The auxiliary mass damper system of claim 21, wherein:
each said receptacle is internally generally flat bottomed, so as to effectively have a generally horizontal bottom.

24. The auxiliary mass damper system of claim 2, wherein:
each said receptacle has an internal bottom wall profile that is downwardly concave in longitudinal cross-section.

25. The auxiliary mass damper system of claim 21, wherein:
each said receptacle has an internal bottom wall profile that is downwardly concave in longitudinal cross-section.

26. The auxiliary mass damper system of claim 2, wherein:
each said receptacle has an internal bottom wall profile that is upwardly concave in transverse cross-section.

27. The auxiliary mass damper system of claim 21, wherein:
each said receptacle has an internal bottom wall profile that is upwardly concave in transverse cross-section.

28. The auxiliary mass damper system of claim 1, wherein:
at least one said receptacle is located internally of and is enclosed by said elongated and slender structurally flexible mechanical element.

29. The auxiliary mass damper system of claim 1, wherein:
said ballast has a mass which is equal to from one-tenth to one-fifth of said given mass.

30. The auxiliary mass damper system of claim 29, wherein:
in use, said ballast displaced against each receptacle with an apparent frequency of 0.8 to 1.0 times the frequency of oscillation of said given mass when oscillating in said given oscillatory mode.

* * * * *